United States Patent
Poulsen

(10) Patent No.: US 6,792,972 B2
(45) Date of Patent: Sep. 21, 2004

(54) EXCESS PRESSURE RELEASE FOR GAS

(75) Inventor: Mogens Poulsen, Frederiksberg (DK)

(73) Assignee: Korsnäs Bates A/S, Norresundby (DK)

( * ) Notice: Subject to any disclaimer, the term of this patent is extended or adjusted under 35 U.S.C. 154(b) by 175 days.

(21) Appl. No.: 10/182,803

(22) PCT Filed: Feb. 2, 2001

(86) PCT No.: PCT/DK01/00076
§ 371 (c)(1),
(2), (4) Date: Aug. 2, 2002

(87) PCT Pub. No.: WO01/57422
PCT Pub. Date: Aug. 9, 2001

(65) Prior Publication Data
US 2003/0010384 A1 Jan. 16, 2003

(30) Foreign Application Priority Data
Feb. 4, 2000 (DK) .......................... 2000 00184

(51) Int. Cl.[7] .......................................... F16K 31/126
(52) U.S. Cl. ................. 137/484.4; 137/484.6
(58) Field of Search .......................... 137/484.2, 484.4, 137/484.6

(56) References Cited
U.S. PATENT DOCUMENTS

| 1,469,201 | A | | 9/1923 | Whitted et al. | |
|---|---|---|---|---|---|
| 2,043,453 | A | * | 6/1936 | Vickers | 137/469 |
| 2,577,851 | A | * | 12/1951 | Hribar | 137/220 |
| 2,886,058 | A | * | 5/1959 | Horton | 137/484.2 |
| 2,966,916 | A | * | 1/1961 | Cummins | 137/39 |
| 3,134,394 | A | * | 5/1964 | Ohta | 137/220 |
| 4,192,343 | A | | 3/1980 | Grahac | |
| 4,467,828 | A | * | 8/1984 | Gneiding | 137/484.4 |
| 5,215,113 | A | | 6/1993 | Terry | |
| 5,462,081 | A | | 10/1995 | Perusek et al. | |

FOREIGN PATENT DOCUMENTS

SE          350321 B    10/1972

* cited by examiner

Primary Examiner—Stephen M. Hepperle
(74) Attorney, Agent, or Firm—Birch, Stewart, Kolasch & Birch, LLP

(57) ABSTRACT

An excess pressure release is provided which at injector effect during inflation of an air cushion ensures an underpressure in a part (23) of a valve chamber. By activating a piston (19), the underpressure retains the excess pressure release in its open position against the force of a spring (11), until a desired counter pressure from the filled air cushion stops the injector effect, whereby the excess pressure release is closed. As a result the air cushion may be inflated at a comparative high pressure and thus in a fast manner. The inflation is stopped automatically and securely, when the desired pressure has been reached in the air cushion.

4 Claims, 7 Drawing Sheets

EXCESS PRESSURE RELEASE FOR GAS

This application is the national phase under 35 U.S.C. §371 of PCT International Application No. PCT/DK01/00076 which has an International filing date of Aug. 2, 2002, which designated the United States of America.

TECHNICAL FIELD

The invention relates to an excess pressure release for gas of the type described in the preamble to claim 1.

For securing palletized goods for instance in a container air cushions are placed and inflated in the gaps typically occurring between separate pallets and/or between the pallets and the walls of the container or another form of transport unit.

Each air cushion is filled manually with compressed air by means of a filler gun. This entails that the operator may unintentionally overfill the air cushion such that the goods are damaged or at worst the air cushion ruptures. Rupture of the air cushion during inflation thereof poses a risk to the safety of the operator. If the cushion ruptures in transit, the goods may be damaged.

Since the air cushion serves to slow down or to absorb any movements in the goods, the pressure in the air cushion increases or decreases according to the load to which the goods are subjected. It is thus not possible to provide the air cushion with a safety valve, which could reduce the pressure, if necessary, at excess pressure.

The applicant has carried out tests on the inflation of air cushions by means of various pressure-relief valves. Typically, the pressure in the air cushions has to be for instance 0.2 bar. Tests have shown that due to the poor flow in the pressure-relief valve it takes about 15 minutes to fill an air cushion by means of a pressure-relief valve set to 0.2 bar. If a pressure-relief valve is not used, it usually takes about 45 seconds to fill the air cushion, but this embodiment involves the above risk of an unintended rupture of the air cushion.

BACKGROUND ART

SE published specification No. 350.321 discloses a charging valve with built-in pressure relief, for instance for gas, having a biassed piston with a passage. A gas reservoir is filled through said piston until a predetermined pressure has been obtained. When this pressure has been reached, differences in area in the valve structure cause a differential pressure to urge the piston back against a spring power and lead the gas out to the surroundings through pressure relief openings. Consequently, the charging valve does not merely shut off the inlet pressure, when the gas reservoir has been charged to the desired pressure.

U.S. Pat. No. 5,462,081 discloses a self-regulating excess flow valve. In normal flow conditions the flow medium flows through a biassed piston. As the flow volume increases, the flow force urges the piston upwards and thus increases the area on which the flow medium exerts a pressure. As a result a drop of pressure occurs below the piston and the piston is spring-urged downwards again. Thus this valve does not serve to stop a charge when a specific pressure has been reached.

U.S. Pat. No. 5,215,113 discloses a safety shut-off valve for hydraulic systems. A valve housing is provided with a valve member with through-going passages abutting a spring. During normal operation the medium flows through these passages. When the pressure on the valve inside exceeds the spring power, the inside is urged forward and closes the passages and thus the flow therethrough. Thus it is not a question of ensuring a specific pressure on the discharge side of the valve.

U.S. Pat. No. 4,192,343 discloses a pressure-relief valve having a biassed hollow pilot piston. The pressure medium on the inlet side is effective on a small surface and moves a conical valve back against a spring force so as to open the valve. The medium may then flow past the conical valve head and exerts pressure on the upper face of the piston. Since the area of the upper face of the piston exceeds that of the valve inlet, the spring power of the piston is more easily overcome and the valve is more easily urged into its full-open position. As mentioned the valve in question is a pressure-relief valve and cannot be used to inflate air cushions, the valve controlling and relieving the pressure on the inlet side, while the pressure on the outlet side usually being atmospheric pressure.

BRIEF DESCRIPTION OF THE INVENTION

The object of the invention is to inflate the air cushion quickly within about 45 seconds, while avoiding the said risk of unintentional overfilling and rupture of the air cushion.

According to the invention an excess pressure release of the above type is used instead of a pressure-relief valve for reducing the pressure to the desired about 0.2 bar, according to the invention said excess pressure release being adapted as stated in the characterising part of the claim 1.

The inlet port of the excess pressure release is connected to another type of pressure-relief valve rendering a pressure of for instance 6.0 bar, while the outlet port of the excess pressure release is connected to the air cushion to be inflated with air. An inflation valve of the type known from the applicant's Danish patent application No. 1996 01148 may be provided in the air cushion. By connecting the air cushion with such an inflation valve the access from the excess pressure release to the air cushion is effected mechanically such that pressure is not required for opening the inflation valve. When a handle-operated air release valve (not shown) provided between the inlet port of the excess pressure release and the above pressure relief valve is opened, the pressure of the said for instance 6.0 bar instantaneously opens the excess pressure release against the force from the biassing means acting on the valve body such that the compressed air flows past the inlet valve seat and the adjacent outer end of the valve body, further in through the said openings in the periphery of the inlet end to the outlet passage provided in the outlet end of the valve body in the outlet port of the excess pressure release and further into the open inflation valve of the air cushion.

The air flows at great speed through the excess pressure release into the air cushion, which is filled within for instance 45 seconds. Due to the injector effect of the air current through the valve body to the outlet port of the excess pressure release, an underpressure arises which in turn via the connection of the outlet port with the other part of the valve chamber causes an underpressure in this part of the valve chamber acting to keep the valve open. When the pressure in the air cushion has reached the desired level of for instance 0.2 bar, a counter pressure arises in the outlet port and stops the injector effect, whereby the underpressure in the said other part of the valve chamber vanishes or changes to a slight over-pressure. Jointly with the over-pressure obtained in the other part of the valve chamber, the biassing means of the excess pressure release urges the valve body to adopt and maintain its closed position, whereby the excess pressure release is shut-off for additional gas supply. This action takes immediate effect when the air pressure in the air cushion has reached the desired over-pressure. As a result a fast and secure closure of the air supply is obtained. In order to ensure that the piston means dividing the valve chamber into two parts does not affect the closure, the said first part of the valve chamber communicates with the surroundings.

As stated in claim 2, preferably the opening between the second part of the valve chamber and the outlet port is obtained by providing the outlet end of the valve body with a conical shape as an injector nozzle, said outlet end jointly with the valve housing forming an annular access opening between the valve housing and said outlet end of the valve body.

Some air cushions are provided with a flexible non-return valve, the opening of which requiring force. Accordingly, the excess pressure release according to the invention may have mechanical means for urging the piston means into its open position as stated in claim 3 and said mechanical means may advantageously be formed as rendered in claim 4.

BRIEF DESCRIPTION OF THE DRAWINGS

The invention is explained in greater detail below with reference to the accompanying drawings, in which.

The same parts are denoted by the same reference numerals on the individual drawings.

BEST MODE FOR CARRYING OUT THE INVENTION

Figure 1:
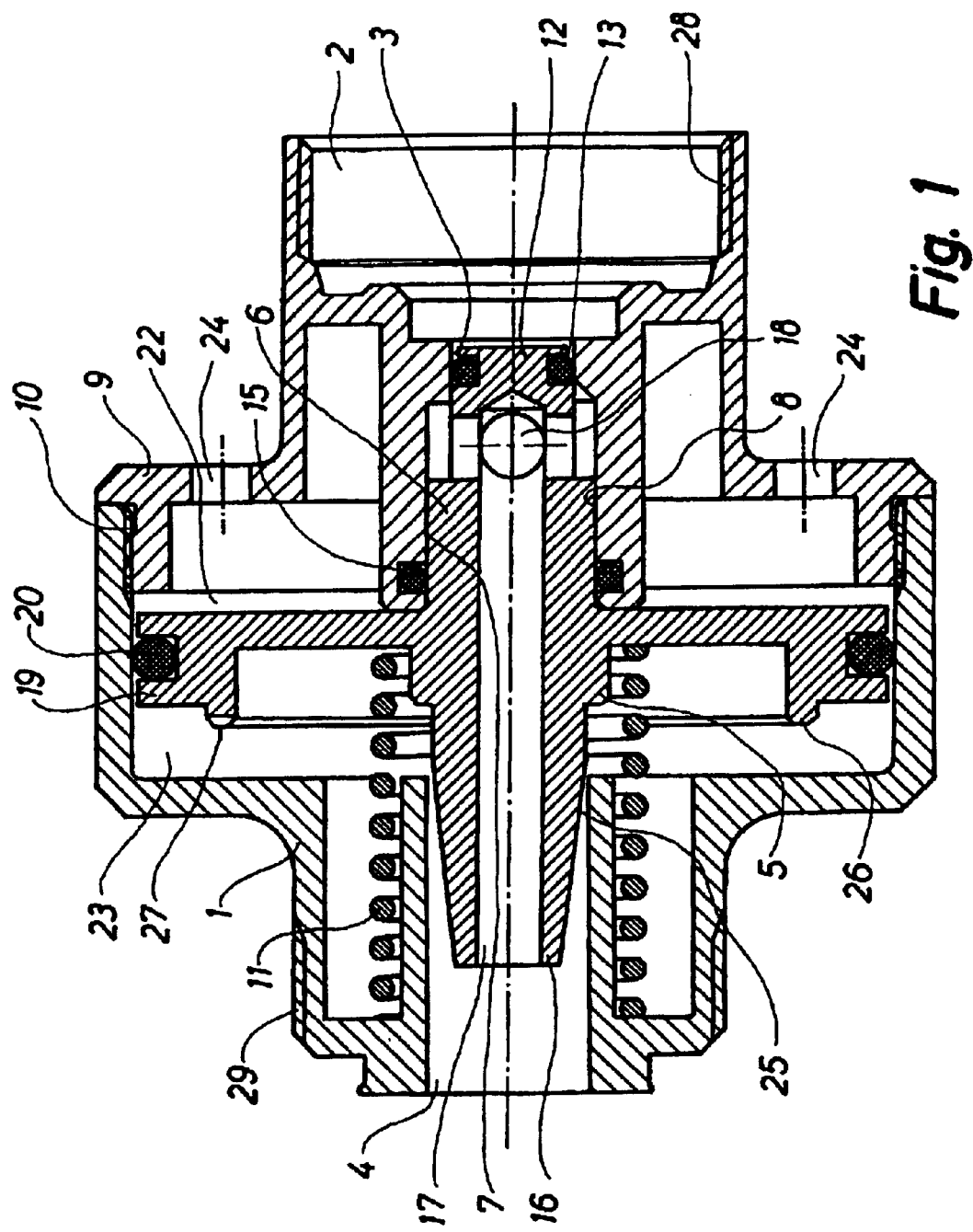
FIG. 1 illustrates a first embodiment of a closed excess pressure release according to the invention.
Figure 2:
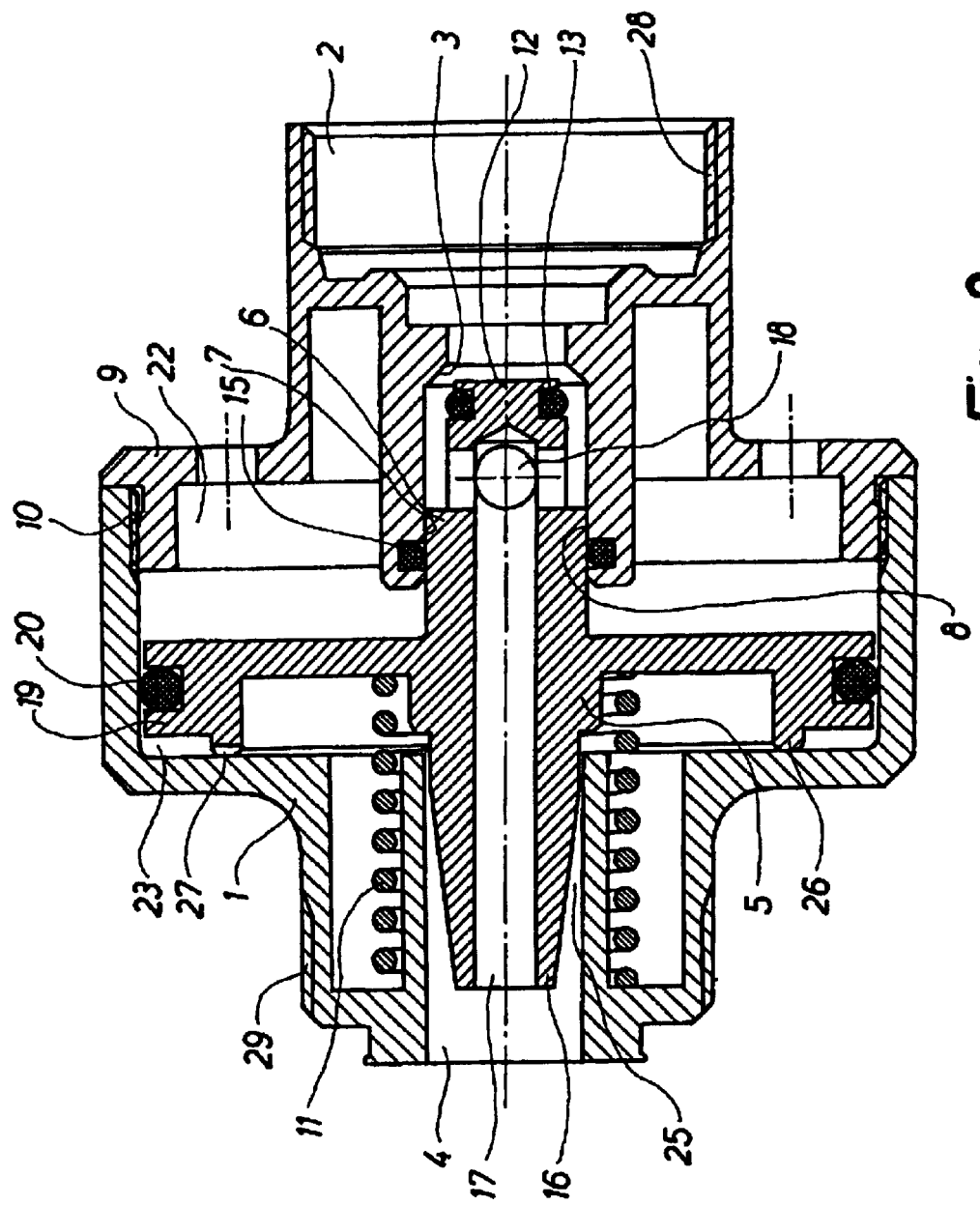
FIG. 2 illustrates the same excess pressure release as in FIG. 1, but when opened.

The first embodiment shown in FIGS. 1 and 2 of an excess pressure release according to the invention comprises a valve housing 1 with an inlet port 2 including an inlet valve seat 3, an outlet port 4 and a valve chamber 22,23 between said ports 2 and 4.

The valve housing 1 is provided with a displaceably arranged valve body 5 having an inlet end 6 whose periphery is slidably arranged in a snugly fitting opening 8 in a wall 9 of the valve housing 1 between the inlet port 2 and the valve chamber. As shown the wall 9 is fixed to the valve housing 1 by means of a threaded connection 10. A biassing means in form of a pressure spring 11 exerts pressure on the valve body 5 in direction towards the valve seat 3 such that the excess pressure release remains closed, an outer end 12 of the inlet end 6 of the valve body 5 being retained in its closed position towards the inlet valve seat 3. In abutment with the valve seat an O-ring 13 is retained in a groove in said outer end 12 to obtain a sealing connection. Furthermore a second O-ring 15 is provided in a second groove in the valve housing, said O-ring sealingly abutting the periphery of the inlet end 6 of the valve body 5. The valve body 5 is provided with an outlet end 16 ending in the outlet port 4 and comprising an outlet passage 17 communicating with one or several openings 18 in the periphery 7 of the inlet end 6 so as to provide access to the gas pressure in the open position of the outer end 12. A piston means 19 comprising an O-ring 20 in an O-ring groove divides the valve chamber into two parts 22 and 23 in an air-tight manner, the first part 22 thereof facing the inlet port 2 and the second part 23 thereof facing the outlet port 4. The piston means 19 is either connected with or integral with the valve body 5. The second part 23 of the valve chamber facing the outlet port 4 encloses the outlet end 16 of the valve body 5 and communicates with the outlet port 4 through at least one opening or passage.

Such openings or passages may be one or more passages 33 (FIGS. 6 and 7) through the wall of the valve housing 1, eg in the wall shown inside of the pressure spring 11 between the part 23 of the valve chamber and the outlet port 4. The first part of the valve chamber communicates with the surroundings through openings 24 in the valve housing to ensure that during movements of the piston means 19 in the valve chamber, pressure changes having an effect on said movements do not occur in the first part 22 of the valve chamber.

Even though the opening between the second part 23 of the valve chamber and the outlet port 4 may be formed of openings or passages 33 in the wall of the valve housing, the said opening in the shown preferred embodiment of FIGS. 1–5 is obtained by providing the outlet end 16 of valve body 5 with a conical shape as an injector nozzle, said outlet end forming an annular access opening 25 jointly with the valve housing 1 between the valve housing 1 and said outlet end 16 of the valve body 5. The area of the annular access opening 25 may optionally gradually decrease as the excess pressure release is opened. It should, however, be noted that access from the second part 23 of the valve chamber to the outlet port 4 always has to be provided.

Figure 5:
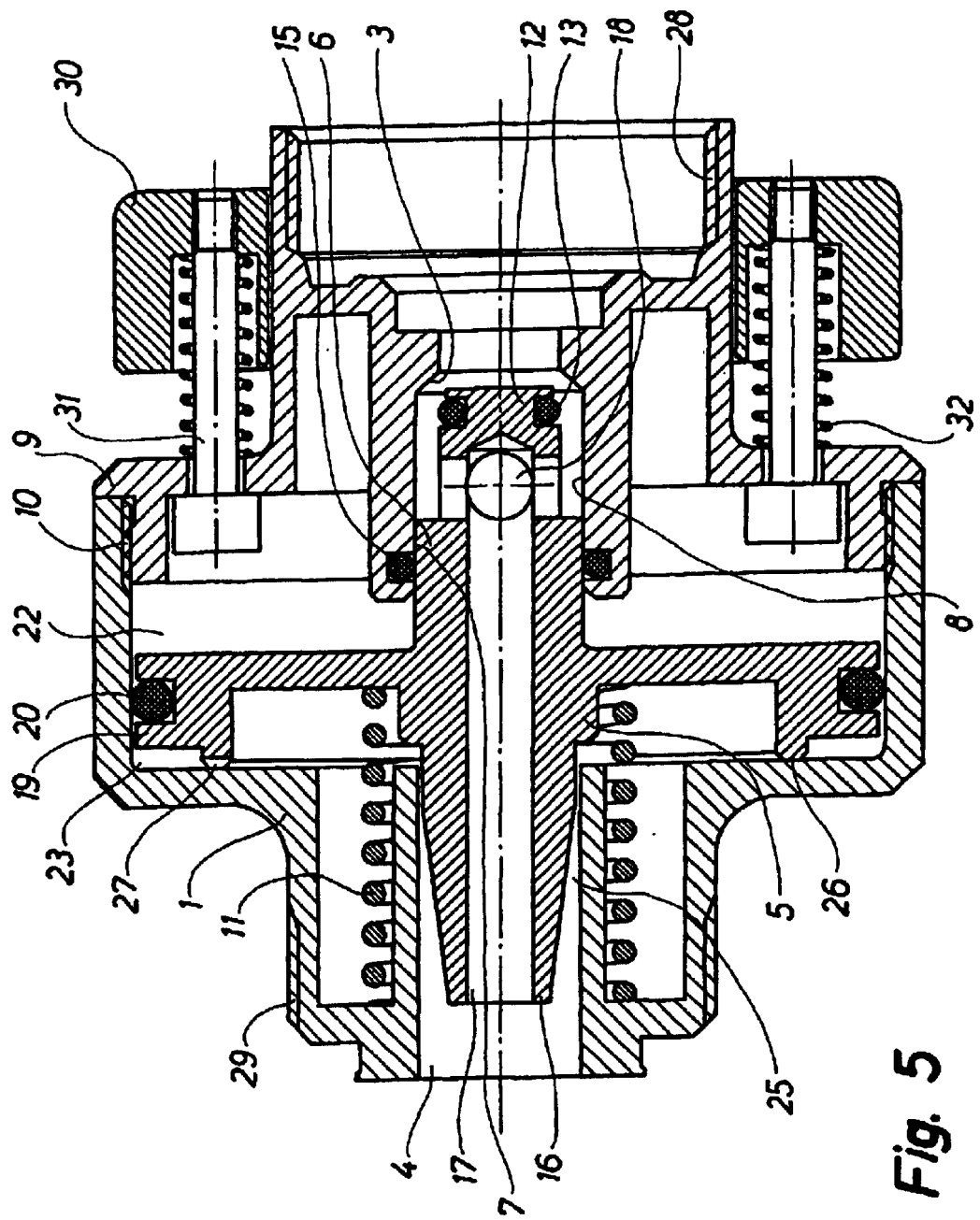
FIG. 5 illustrates the same embodiment according to the invention as in FIGS. 3 and 4, but when opened.

As shown in FIGS. 2 and 5 the excess pressure release may be opened for air flow-through until the shown state, in which the circumferential projection 26 on the piston means abuts an inner wall of the valve housing 1. The projection 26 is provided with at least one perforation 27 to ensure the access from the second part 23 of the entire valve chamber to the outlet port 4.

Finally at the inlet port 2 the excess pressure release is provided with an internal thread 28 for connecting an external thread on a handle-operated air release valve (not shown), air being fed to the air release valve from a compressed air source via a pressure-relief valve (not shown), which for instance may be set to 6 bar, if the air cushion desirably is to have a pressure of 0.2 bar, or be set to 4–5 bar or 7–8 bar, if a pressure of 0.1 or 0.3 bar, respectively is to be provided in the air cushion.

Moreover an external thread 29 is provided on the valve housing 1 of the excess pressure release for connection of an inflation valve to an air cushion. The inflation valve (not shown) may for instance be of the type known from the applicant's Danish patent application No. 1996 01148.

Figure 6:
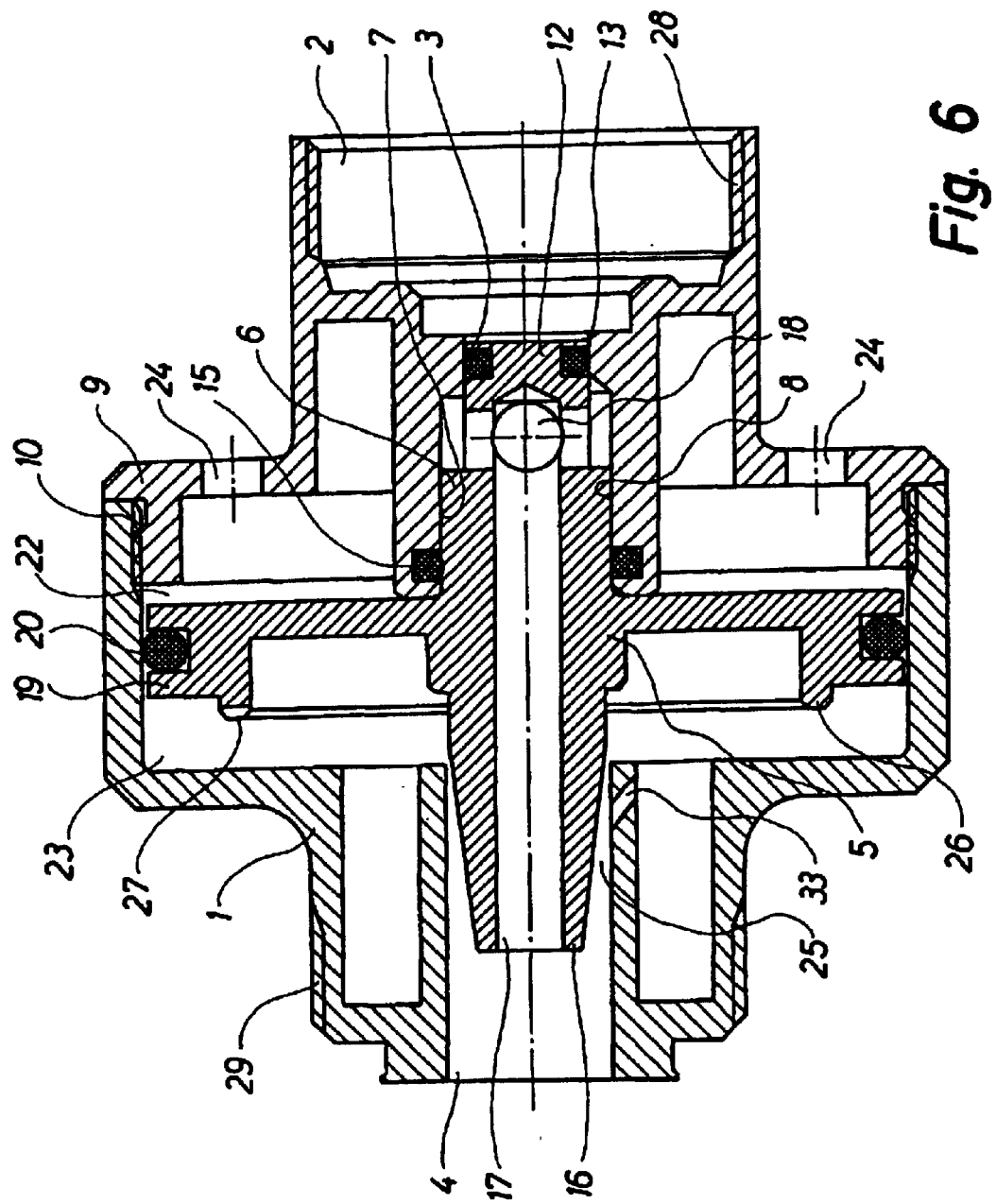
FIG. 6 illustrates an embodiment according to the invention corresponding to the one in FIG. 1 with the exception that the pressure spring has been omitted and at least one built-in passage is provided connecting the second part of the valve chamber with the annular access opening between the valve housing and the outlet end of the valve body.
Figure 7:
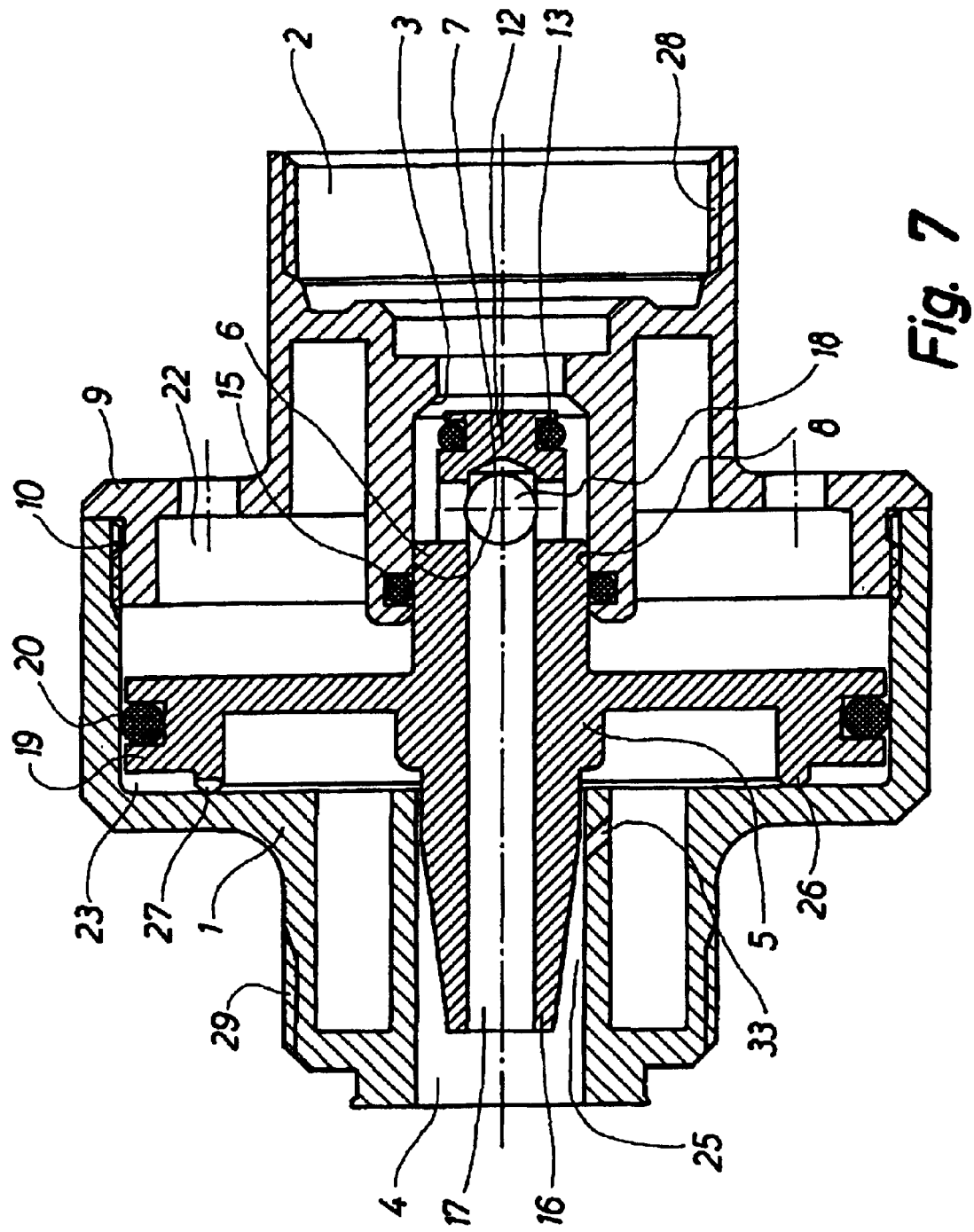
FIG. 7 illustrates the same embodiment as in FIG. 6, the excess pressure release being shown when opened.

It has been found that in some cases it is possible to omit the pressure spring 11 such that the operation of the excess pressure valve is solely controlled by the pressure conditions at the inlet port and outlet port of the valve, as shown on the embodiment in FIGS. 6 and 7. It should furthermore be noted that the passage 33 shown in this embodiment does not relate to the omitted pressure spring, the pressure spring 11 in some instances also being omitted from the embodiments shown in FIGS. 1–5. The instances in which the pressure spring 11 may be omitted relate to particularly low pressure on the outlet side of the excess pressure valve.

The excess pressure release operates in such a manner that an air pressure from the air release valve (not shown) of for instance 6.0 towards the inlet port 2 urges the outer end 12 of the valve body 5 away from the valve seat 3 and into an open position. As a result the gas pressure gains access to a slightly larger sectional area of the inlet end 6, whereby an even heavier force urges the valve body 5 in direction towards its open position against the pressure from the pressure spring 11. The gas pressure then passes through the openings 18 in the periphery of the inlet end 6 and through the outlet passage 17 and further into a connected air cushion (not shown). Due to relatively high pressure of 6.0 bar at the inlet side, the air cushion is quickly inflated within about 45 seconds, regardless of whether the air cushion contains 2 or 300 litres. An underpressure arises during inflation due to injector effect around the outlet end 16 ending in the outlet port 4, said underpressure spreading to the second part 23 of the valve chamber and contributes to retaining the excess pressure release in open position. When the pressure in the air cushion has reached the desired value of for instance 0.2 bar, a counter pressure arises in the outlet port 4, which counteracts the injector effect and spreads to the other part 23 of the valve chamber. Thus a certain over-pressure arises in the second part 23 of the valve chamber which acts on the piston means 19 jointly with the pressure from the pressure spring 11 and shuts off the excess pressure release for additional air supply. The air cushion is thus filled.

Figure 3:
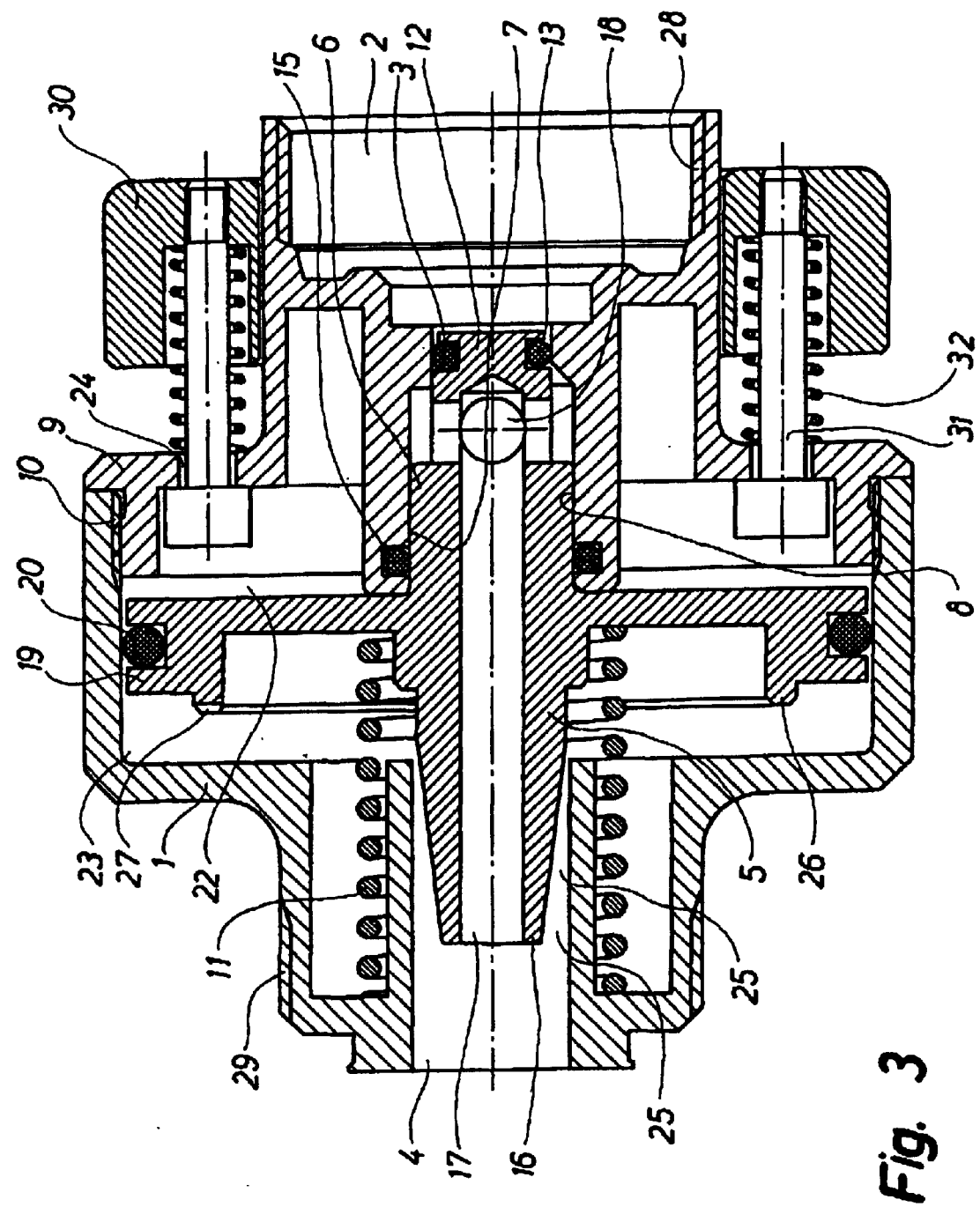
FIG. 3 illustrates another embodiment of a closed excess pressure release according to the invention.
Figure 4:
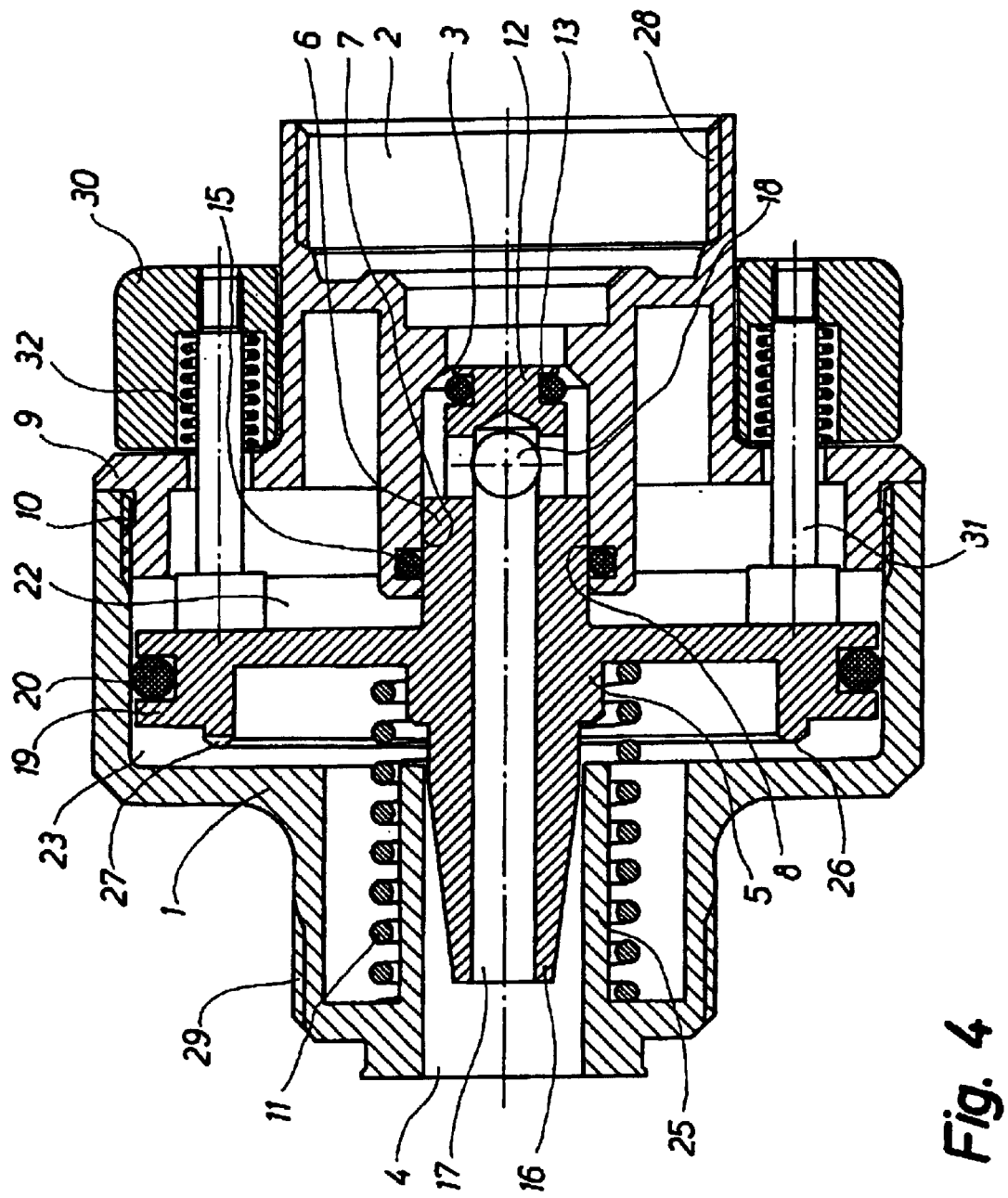
FIG. 4 illustrates the same embodiment according to the invention as in FIG. 3, but partly opened.

FIGS. 3 to 5 show the same excess pressure release provided with means for ensuring that the excess pressure release may be used in connection with an air cushion with no access to the interior of the air cushion. Some air cushions are thus provided with a flexible non-return valve, the opening of which requires force. The excess pressure release shown in FIGS. 3–5 comprises a ring 30 with bars 31 arranged on the valve housing 1 around the inlet port 2, said ring with bars being urged to abut the piston means 19 against the force of pressure springs 32, said bars 31 going through openings in the wall 9 of the valve housing 1. It is thus possible to open the excess pressure release manually, whereby air pressure gains directly access to the air cushion due to a heavy air pulse and thus opens the non-return valve thereof. The ring 30 is then released and the excess pressure release operates in the same manner as the excess pressure release in FIGS. 1 and 2.

What is claimed is:

1. Excess pressure release for gas comprising a valve housing (1) having an inlet port (2) with an inlet valve seat (3), an outlet port (4), and a valve chamber (22,23) between said ports (2,4), said valve housing (1) further comprising a valve body (5) displaceably arranged therein and provided with an inlet end (6), the periphery of which being slidably arranged in a snugly fitting opening (8) in a wall (9) of the valve housing (1) between the inlet port (2) and the valve chamber (22,23) and sealed against the valve chamber (22,23), the outer end (12) thereof facing the inlet valve seat (3) remaining closed towards the inlet valve seat (3) by means of a biassing means acting on the valve body (5), until the gas pressure at the inlet port (2) exceeds a predetermined gas pressure urging the valve body (5) into an open position and said valve body (5) comprising an outlet end (16) ending in the outlet port (4) and having an outlet passage (17) communicating with one or several openings (18) in the periphery (7) of the inlet end (6) for allowing the gas pressure access in the open position of the inlet end (6), characterised in that a piston means (19) connected with the valve body (5) divides the valve chamber into two parts (22 and 23) in an air-tight manner, the first part (22) thereof facing the inlet port (2) and the second part (23) facing the outlet port (4), wherein the second part (23) of the valve chamber facing the outlet port (4) encloses the outlet end (16) of the valve body (5) and communicates with the outlet port (4) through at least one opening, while the first part (22) of the valve chamber communicates with the surroundings.

2. Excess pressure release according to claim 1, characterised in that the opening between the second part (23) of the valve chamber and the outlet port (4) is obtained by providing the outlet end (16) of the valve body (5) with a conical shape as an injector nozzle, said outlet end jointly with the valve housing (1) forming an annular access opening (25) between the valve housing (1) and the outlet end (16) of the valve body (5).

3. Excess pressure release according to claim 1 or 2, characterised in that it comprises mechanical means for urging the piston means (19) into its open position.

4. Excess pressure release according to claim 3, characterised in that the mechanical means comprise a ring (30) arranged axially displaceable around the inlet port (2) on the valve housing (1) and provided with bars (31) going through the wall (9) of the valve housing and made to abut the piston means (19) against the force of pressure springs (32).

* * * * *